(12) United States Patent
Nishikawa (10) Patent No.: US 6,381,386 B1
(45) Date of Patent: Apr. 30, 2002

(54) V-SHAPED OPTICAL COUPLING STRUCTURE

(75) Inventor: Toshiaki Nishikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/296,421

(22) Filed: Apr. 23, 1999

(30) Foreign Application Priority Data

Apr. 23, 1998 (JP) ............................................ 10-129507

(51) Int. Cl.⁷ ................................................ G02B 6/26
(52) U.S. Cl. ........................................... 385/32; 385/39
(58) Field of Search ............................. 385/32, 39, 88, 385/140

(56) References Cited

U.S. PATENT DOCUMENTS 5,193,132 A * 3/1993 Uken et al. .................... 385/32
5,463,706 A * 10/1995 Dumont et al. ............... 385/32
5,708,265 A * 1/1998 Poole ....................... 250/227.14

FOREIGN PATENT DOCUMENTS

| JP | 62-115106 | 5/1987 |
| JP | 2-234476 | 9/1990 |
| JP | 4-308804 | 10/1992 |

OTHER PUBLICATIONS

Japanese Utility Model JP 62–6246 (Laid–Open No. 63–115105) published Jul. 25, 1988.

* cited by examiner

Primary Examiner—F L Evans
Assistant Examiner—Layla Lauchman
(74) Attorney, Agent, or Firm—Foley & Lardner (57) ABSTRACT

An optical coupling structure for optically coupling a light emitting device to an optical waveguide is disclosed. The optical coupling structure includes a V-shaped inclined portion provided on part of the optical waveguide, and a light-incident section formed on a protruding side of the V-shaped inclined portion in association with a light emitting section of the light emitting device.

14 Claims, 14 Drawing Sheets

OPTICAL FIBER 102

HEATING

FIG.6B

V-BENT PORTION 104
501
501
102

205 LIGHT-INCIDENT PORTION

FIG.9A

OPTICAL FIBER 102

HEATING

V-BENT PORTION 104

V-SHAPED OPTICAL COUPLING STRUCTURE

BACKGROUND OF THE INVENTION

1. Field of the Invention

The present Invention relates to an optical device, and more particularly to a structure for optically coupling the light emitting section of a light-emitting device with an optical waveguide.

2. Description of the Related Art

As the speed of communication systems is getting faster and their band is becoming broader, the amount of signal processing in a signal processor is increasing tremendously. Particularly, optical means is required for fast transfer of the vast amount of information between modules in a transmission apparatus. These days, such a huge amount of information processing is accomplished generally by a parallel optical interface module which transmits and receives a plurality of light signals in parallel.

Laser diodes are used as typical light emitting devices on the transmission side of a parallel optical interface module, with a plurality of optical fibers arranged in association with their light emitting areas. It is necessary to align the optical axes of those optical fibers with the light emitting region at a high precision (for example, a precision of less than 5 $\mu$m).

There have been known two types of laser diode an edge-emitting laser diode d a surface-emitting laser diode. In the case of the edge-emitting laser diode, since the pass/fail check cannot be performed before those devices are cut out, the increasing number of light emitting sections to be formed on a single device reduces the production yield. The edge-emitting laser diode is therefore disadvantageous in its use in a parallel optical interface module. Another disadvantage is that the light emitting sections can be formed only linearly, resulting in the limited number of parallel transfers.

By way of contrast, in the case of surface-emitting laser diodes, the pass/fail check can be performed in such a state that those laser diodes are formed on a semiconductor wafer, resulting in a higher production yield. Further, the light emitting sections can be arrayed two-dimensionally, so that the surface-emitting laser diode is advantageous over the edge emitting type In the number of parallel transfers. However, a consideration should be made on how to couple the two-dimensional array of light emitting sections to optical fibers. If the edges of optical fibers are laid perpendicular to the two-dimensional array of light emitting sections, the device undesirably becomes large besides the difficulty of holding multiple optical fibers in the perpendicular direction.

In Japanese Unexamined Patent Publication No. 2-234476, disclosed a structure in which a mirror surf ace inclined by 45 degrees is formed on each light emitting region of a surface-emitting laser diode to allow lights from the two-dimensional array of light emitting sections to travel in parallel to the light emitting surfaces and enter the optical fibers.

In Japanese Unexamined Patent Publication No. 4-308804, disclosed an optical module in which reflective surfaces formed by obliquely polishing the ends of optical fibers are provided on a light emitting/receiving device and lights are input to and output from the light emitting surfaces in parallel to the light emitting surfaces.

The method which forms inclined mirror surfaces on the light emitting surfaces of each surface-emitting laser diode for optical coupling to the associated optical fibers requires a step of separately forming the reflective surfaces and optical fibers and further requires the space where the mirror surf aces are provided.

The method which cuts optical fibers and forms reflective surfaces on their edges also requires a step of separately forming the reflective surfaces and optical fibers. This method may be effective for linearly arranged light emitting sections. When the light emitting sections are arrayed two-dimensionally as in the case of surface-emitting laser diodes, however, it is necessary to cut each optical fiber at different lengths and to polish each cut fiber. This not only complicates the production process, but also makes the positioning of the optical fibers significantly difficult.

SUMMARY OF THE INVENTION

Accordingly, it is an object of the present invention to provide a structure capable of optically coupling a light emitting device and an optical waveguide easily and accurately.

It is another object of the present invention to provide a compact optical device which has a light emitting device and an optical waveguide optically coupled together and is easy to manufacture.

According to one aspect of this invention, there is provided an optical coupling structure for optically coupling a light emitting device to an optical waveguide having a center portion of a relatively high refractive index and a peripheral portion of a relatively low refractive index, which structure comprises a V-shaped inclined portion provided on part of the optical waveguide: and a light-incident section formed on a protruding side of the V-shaped inclined portion in association with a light emitting section of the light emitting device.

The optical coupling structure may be formed by bending a predetermined portion of the optical waveguide into a V shape, yielding a V-bent portion; and forming a light-incident surface on a protruding portion of the V-bent portion. It is preferable to fix both sides of the predetermined portion of the optical waveguide, and to move at least one of the both sides by a given distance in an optical waveguiding direction of the fixed optical waveguide toward the predetermined portion, thereby forming the V-bent portion at the predetermined portion.

As part of an optical waveguide like an optical fiber is used to form a V-shaped inclined portion and a light incident section, the optical waveguide can be arranged in parallel to the surface where the light emitting sections of a light emitting device are formed. This can decrease the required space considerably.

Further, the V-shaped inclined portion at part of the optical waveguide can be formed by positioning that part with respect to the light emitting section of the light emitting device, so that optical coupling can be realized merely by high-precision two-dimensional positioning. For example, a surface emitting light emitting device having a plurality of light emitting sections arrayed two-dimensionally can be coupled to a plurality of optical waveguides just by two-dimensional positioning, and the production of the optical coupling structure becomes significantly easier.

As the flux of rays from a light emitting section is split into two by the V-shaped inclined portion, the split lights can be used for different purposes. This structure is extremely advantageous in the field of application. For example, one output light can be used for data transfer while the other can be used for monitoring a light emitting device. Alternatively, one output light can be used for data transfer for an operating

DETAILED DESCRIPTION OF THE PREFERRED EMBODIMENTS

FIRST EMBODIMENT

Figure 1:
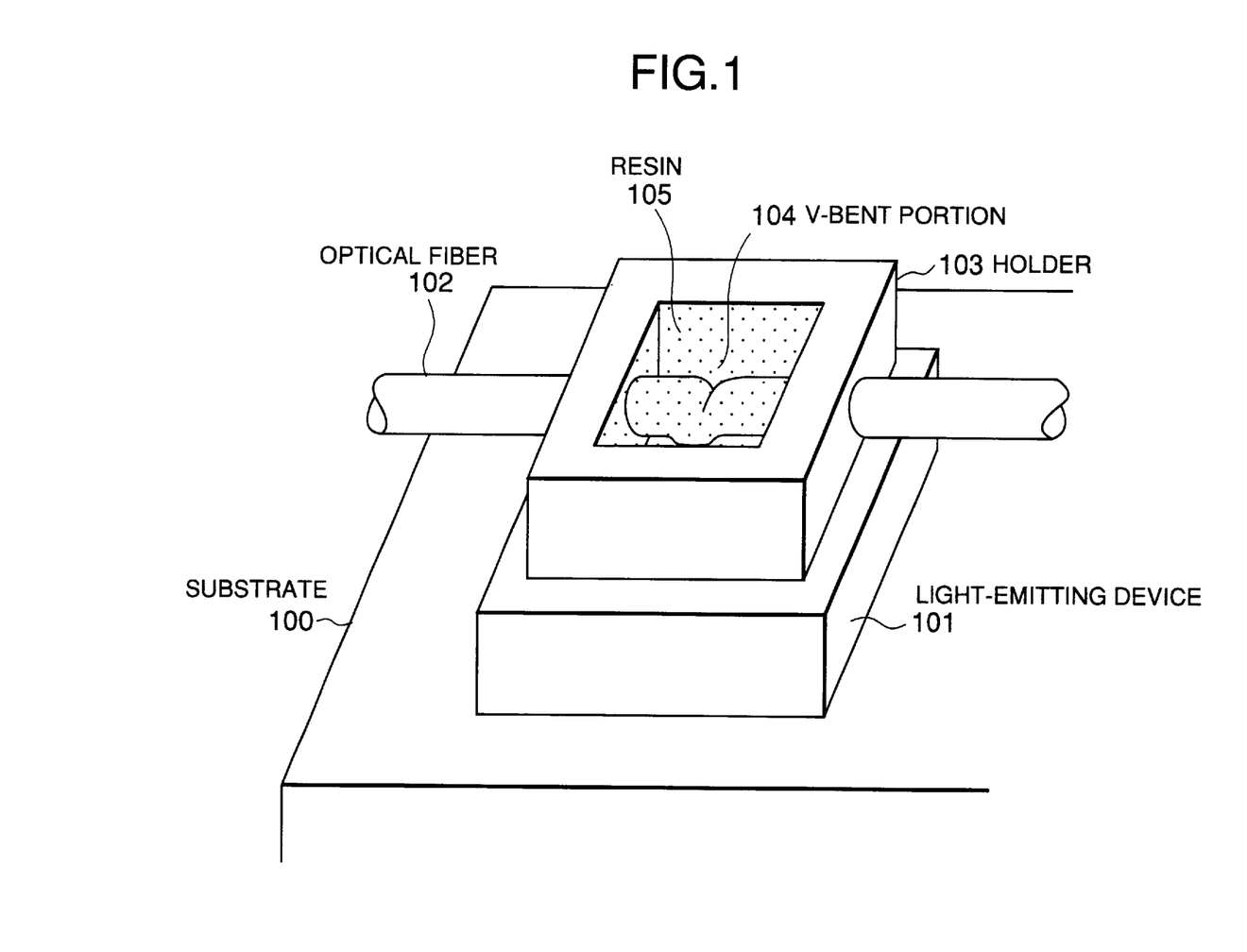
FIG. 1 is a perspective view illustrating an optical device according to a first embodiment of the present invention.

As shown in FIG. 1, the optical device according to this embodiment has a light emitting device 101 such as a surface-emitting laser diode (LD) provided on a substrate 100, and a holder 103 provided on the light emitting device 101, for holding an optical fiber 102. The optical fiber 102 in the holder 103 has a V-bent portion 104 formed at a position corresponding to the light emitting section of the light emitting device 101, with a resin 105 filling the space inside the holder 103 to protect and secure the V-bent portion 104.

Figure 2:
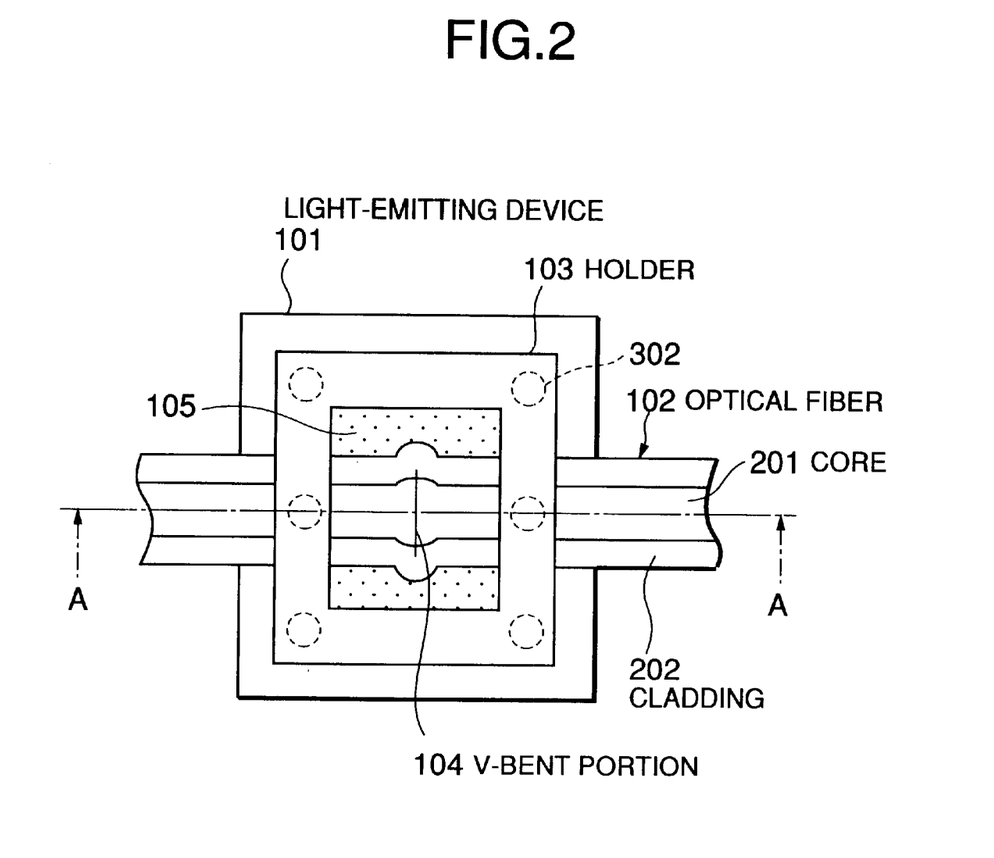
FIG. 2 is a plan view of the first embodiment shown in FIG. 1.
Figure 3:
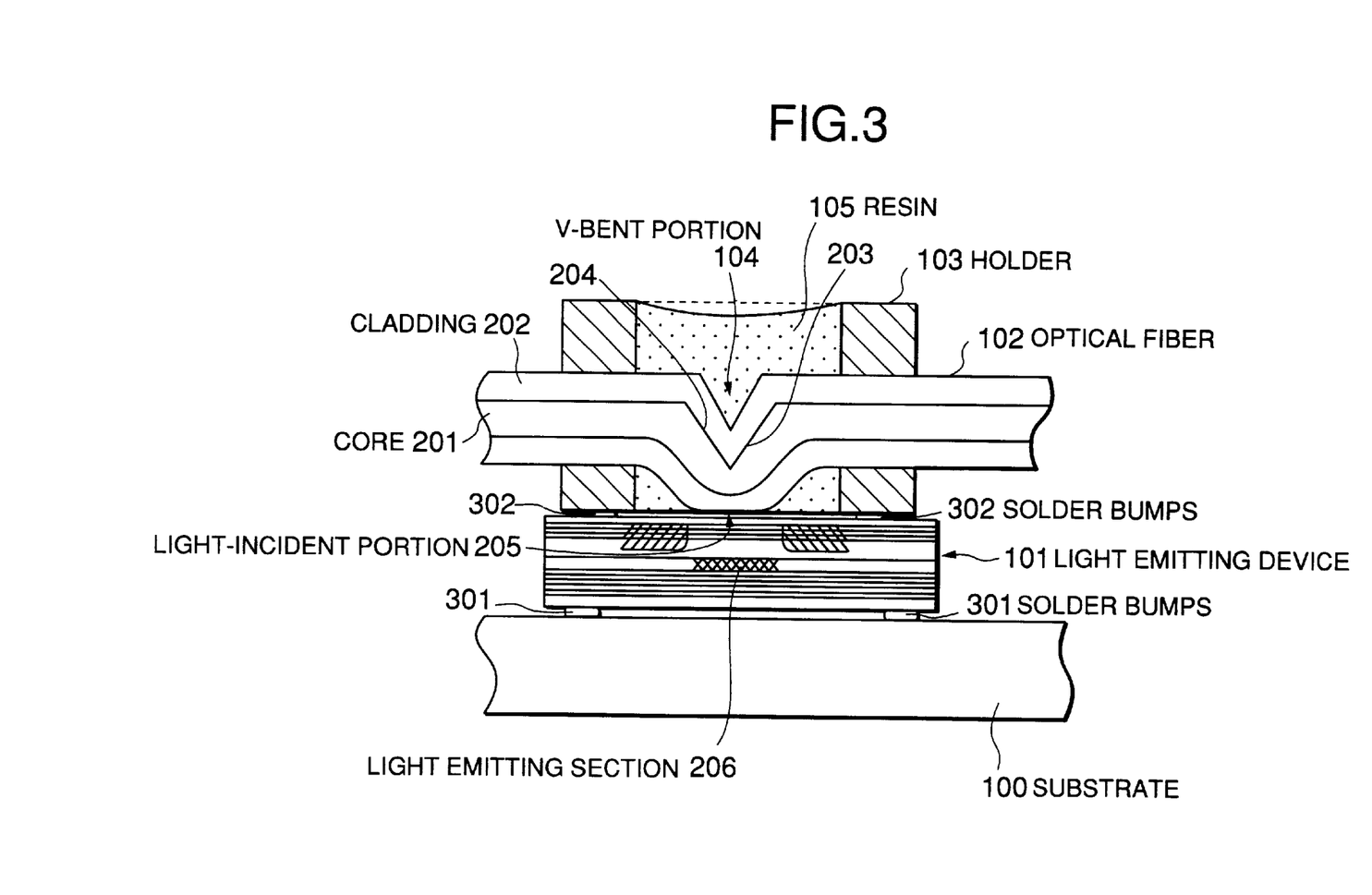
FIG. 3 is a cross-sectional view along the line A—A in FIG. 2.

Referring to FIGS. 2 and 3, a more detailed description will now be given with a quartz step-index type optical fiber used as the optical fiber 102. The optical fiber 102 is comprised of a core 201 covered with a cladding 202. It is known that the refractive index of the core 201 is higher than that of the cladding 202. Both the core 201 and cladding 202 are bent in a V shape at the V-bent portion 104 of the optical fiber 102, which is slightly spreading in the diametric direction of the optical fiber 102 as shown in FIG. 2.

The formation of the V-bent portion 104, which will be discussed later, forms inclined surfaces 203 and 204 on the core 201 at the V-bent portion 104 with respect to the light output surface of the light emitting device 101. A light-incident section 205, which is flat and has been polished, is formed on the opposite side to the V-bent portion 104.

A vertical cavity surface emitting laser (VCSEL), for example, can be used for the light emitting device 101 In this case, a light emitting section 206 is formed on the active region of the VCSEL.

The holder 103 positions the optical fiber 112 in such a manner that the light emitting section 206 of the light emitting device 101 and the V-bent portion 104 of the optical fiber 102 have a certain positional relationship, and the optical fiber 102 is fixed there by means of the resin 105. The light-incident section 205 formed opposite to the V-bent portion 104 is placed slightly above the light output surface of the light emitting device 101. The light emitting device 101 is connected to the substrate 100 by a plurality of solder bumps 301, and the holder 103 is connected by a plurality of solder bumps 302.

Figure 4:
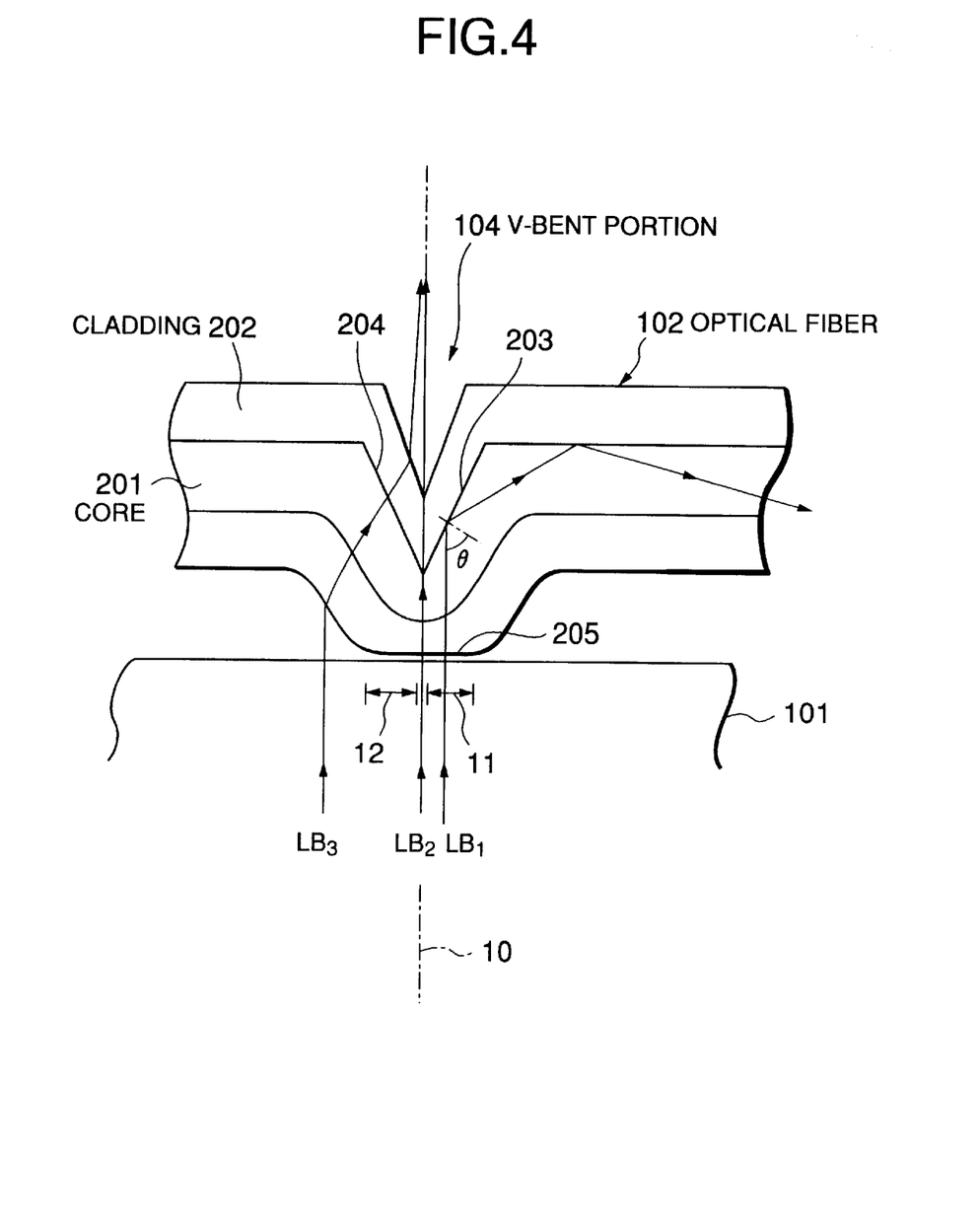
FIG. 4 is an exemplary cross-sectional view of a V-bent portion for explaining the operation of the first embodiment.

Referring to FIG. 4 the flux of light, $LB_1$, whose deviation from a bent plane 10 of the V-bent portion 104 lies within predetermined effective ranges 11 and 12, after leaving the light output surface of the light emitting device 101, reaches the light-incident section 205 via an air layer between that light output surface and the light-incident section 205 of the optical fiber 102, and enters the core 201. If the inclination angle of the inclined surface 203 of the core 201 at the V-bent portion 104 is set in such a way that the light flux $LB_1$ will have total reflection at the interface between the core 201 and the cladding 202 and then the light flux $LB_1$ travels inside the core 201 as it is.

That is, from the Snell's law, the V-bent portion 104 should be formed go that the incident angle θ to the cladding 202 from the core 201 satisfies the following equation (1):

$$\theta > \sin^{-1}(n_2/n_1) \tag{1},$$

where $n_1$ is the refractive index of the core 201 and $n_2$ is the refractive index of the cladding 202. In the case of a step-index type optical fiber with $n_1=1.6$ and $n_2 1.45$, for example, the incident angle θ is about 20 degrees.

By way of contrast, a light flux $LB_2$ traveling along the bent plane 10 of the V-bent portion 104 and a light flux $LB_2$, whose deviation from the bent plane 10 lies outside the effective ranges 11 and 12, pass through the optical fiber 102 without total reflection.

Widening the effective ranges 11 and 12 therefore improves the efficiency of optical coupling between the light emitting device 101 and the optical fiber 102. In other words, the structure of the V-bent portion 104 is an important factor in improving the optical coupling efficiency.

By properly setting the positional relationship between the light emitting section 206 of the light emitting device 101 and the bent plane 10 of the V-bent portion 104, the laser beam from the light emitting section 206 can be split into two with the bent plane 10 as the boundary. For example, it is possible to easily use one beam component as transmission light and the other one as monitoring light for the light emitting device 101.

SECOND EMBODIMENT

Figure 5:
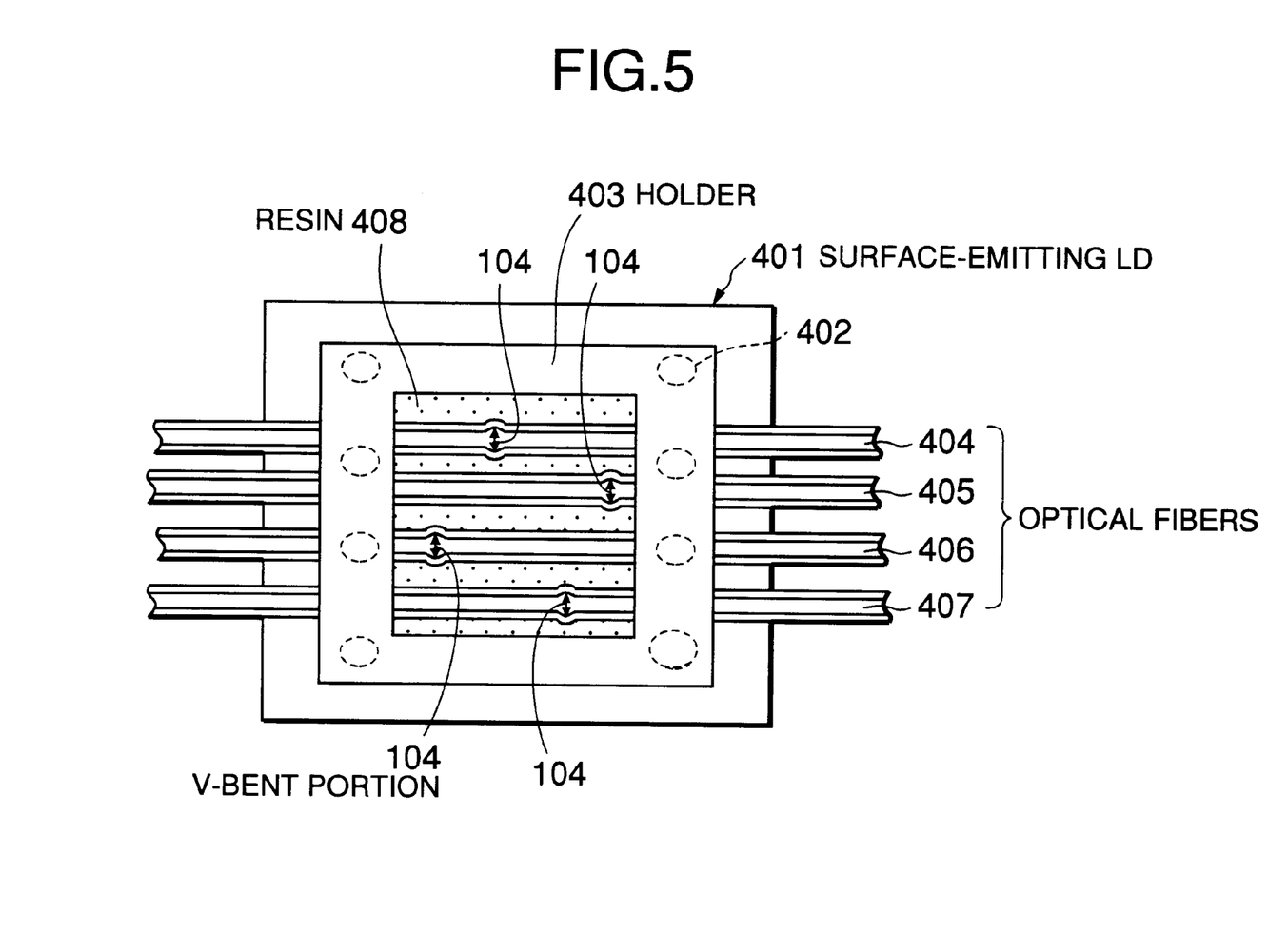
FIG. 5 is a plan view showing an optical device according to a second embodiment of this invention.

Referring to FIG. 5, a holder 403 is connected onto a surface-emitting LD 401, which has four light emitting sections arrayed two-dimensionally, by means of a plurality of solder bumps 402.

The holder 403 holds optical fibers 404 to 407 each having the aforementioned V-bent portion 104 formed therein. In the frame of the holder 403, the V-bent portions 104 of the individual optical fibers are so positioned as to be associated with the light emitting sections of the surface emitting type LD 401, and are secured by a resin 105. The holder 403 is secured on the surface-emitting LD 401 by the solder bumps 402, with the V-bent portions 104 so positioned as to be associated with the light emitting sections of the surface-emitting LD 401.

The optical device according to the second embodiment, as will be discussed later, can be manufactured by a step of two-dimensionally positioning the individual V-bent portions 104 of the optical fibers 404–407 in the holder 403 and then securing them, and a step of two-dimensionally positioning the holder 403 and the surface-emitting LD 401 in such a way that the individual V-bent portions 104 face the respective light emitting sections.

OPTICAL COUPLING STRUCTURE FORMATION

Figure 6A:
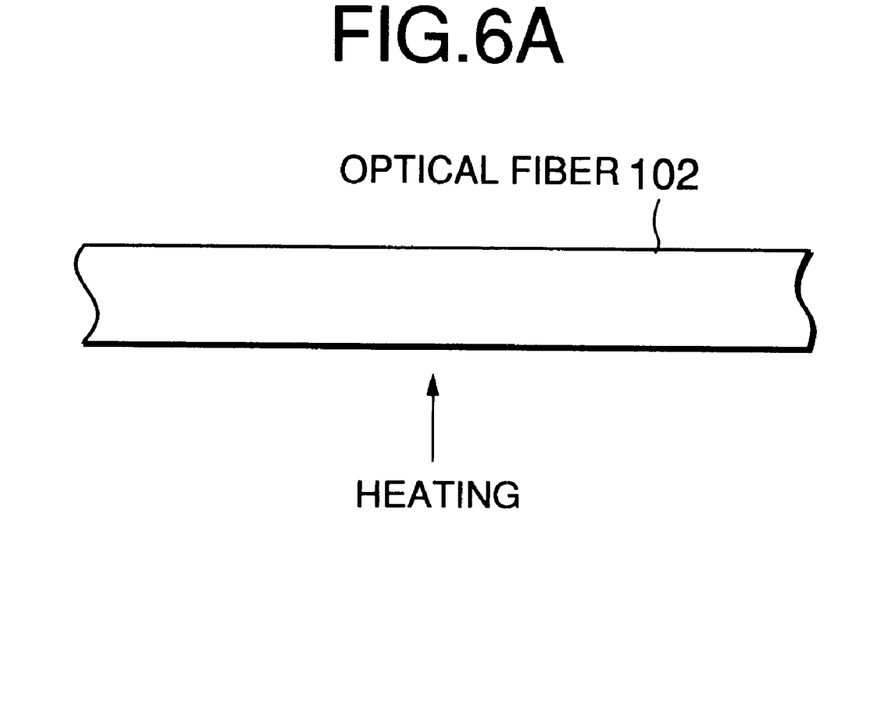
FIG. 6A is a diagram showing an optical fiber before bent according to a first example of a method of forming a V-bent portion in an optical coupling structure shown in FIG. 3.

As shown in FIG. 6A, first, a portion of the optical fiber 102 where the V-bent portion is to be formed is heated up to near the quartz softening point. When that portion is heated up to near the quartz softening point, both ends of the optical fiber 102 are pressed by a given amount in a direction of arrows 501 along the axis of the optical fiber 102, thus forming the V-bent portion 104, as shown in FIG. 6B At this time, given force has only to be applied from the recess side of the V-bent portion 104, so that the softened portion of the optical fiber 102 is bent in a v shape.

Figure 6B:
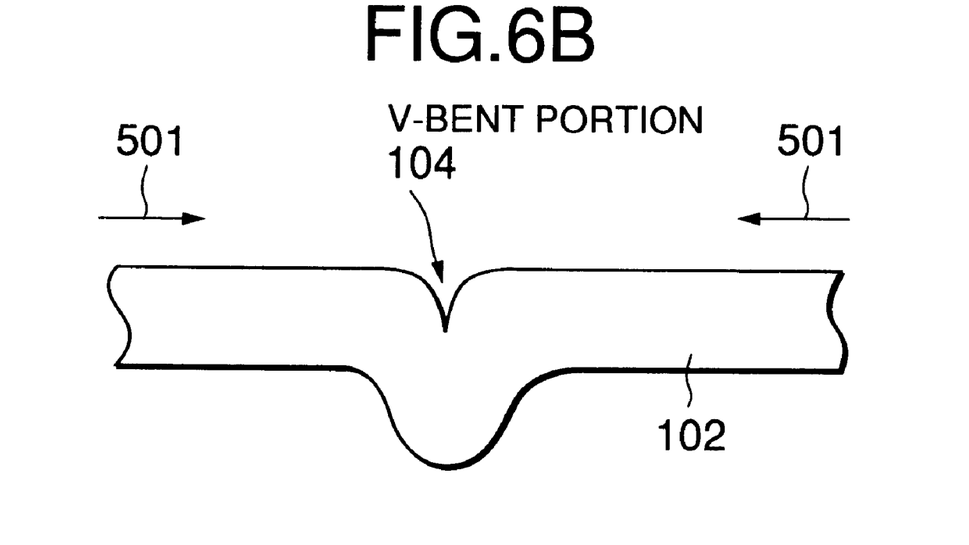
FIG. 6B is a diagram showing the optical fiber formed the V-bent portion according to the first example of the V-bent portion forming method.
Figure 7A:
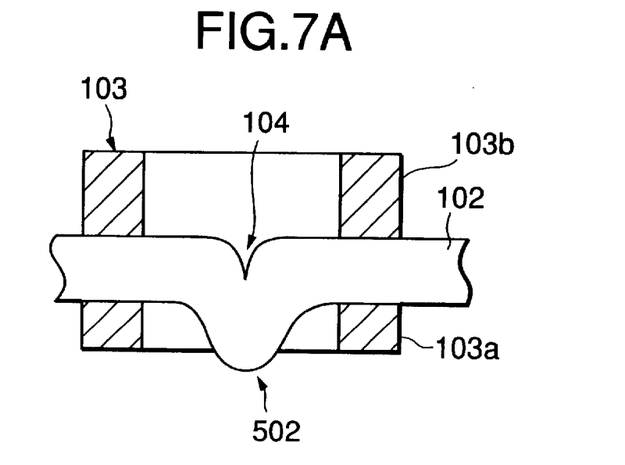
FIGS. 7A–7C illustrate a process for producing an optical coupling structure according to the first embodiment.

As shown in FIG. 7A, first, the optical fiber 102 having the V-bent portion 104 formed as discussed with reference to FIG. 6B is placed in positioning grooves (not shown) provided on both sides of a lower holder frame 103a and is two-dimensionally arranged so as to be associated with the light emitting section 206 of the light emitting device 101, as shown in FIG. 7A. Then, the optical fiber 102 with the V-bent portion 104 formed therein is attached to the holder 403 by placing an upper holder frame 103b over the lower holder frame 103a and fixing both frames together. The holder 103 comprises the lower holder frame 103a and the upper holder frame 103b.

The height of the lower holder frame 103a is set in such a manner that when the optical fiber 102 is placed in the positioning grooves in the lower holder frame 103a, the end of a projection 502 of the V-bent portion 104 protrudes from the bottom surface of the lower holder frame 103a. The end of the projection 502 of the V-bent portion 104 is where the light emitting section 205 is to be formed as will be discussed later.

Figure 7B:
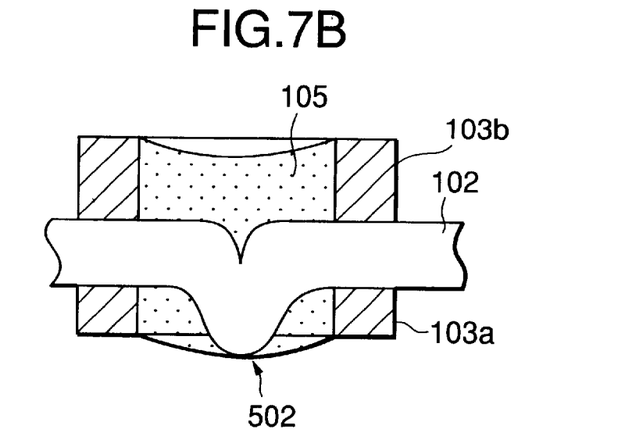

Subsequently, as shown in FIG. 7B, a thermosetting resin 105 like epoxy resin is let to flow into the frame of the holder 103 and is hardened. The thermosetting resin 105 is hardened, protruding from the bottom of the lower holder frame 103a together with the distal end of the projection 502 of the V-bent portion 104.

Figure 7C:
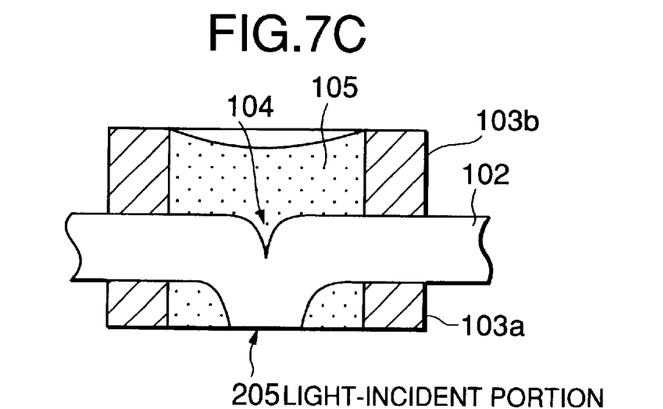

Then, as shown in FIG. 7C, the projection 502 of the V-bent portion 104 and the thermosetting resin 105, both protruding from the bottom of the lower holder frame 103a, are removed and polished, forming the flat light-incident section 205. Then, a positioning mark for the next step is put to the holder 103 holding the optical fiber 102 formed with the V-bent portion 104.

Figure 8A:
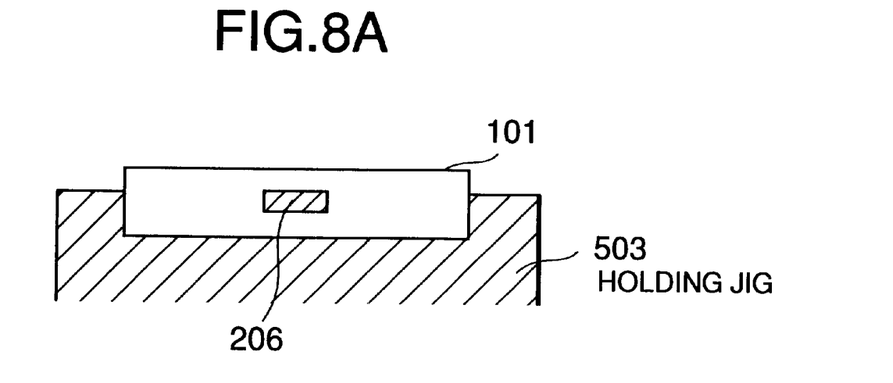
FIGS. 8A and 8B illustrate a process for manufacturing an optical device as shown in FIG. 3.

After the holder 103 holding the optical fiber 102 shown in FIG. 7C is formed, the light emitting device 101 like a surface-emitting laser is Secured to a holding jig 503 as shown in FIG. 8A. A positioning mark is put on the top surface of this light emitting device 101 at a predetermined location.

Figure 8B:
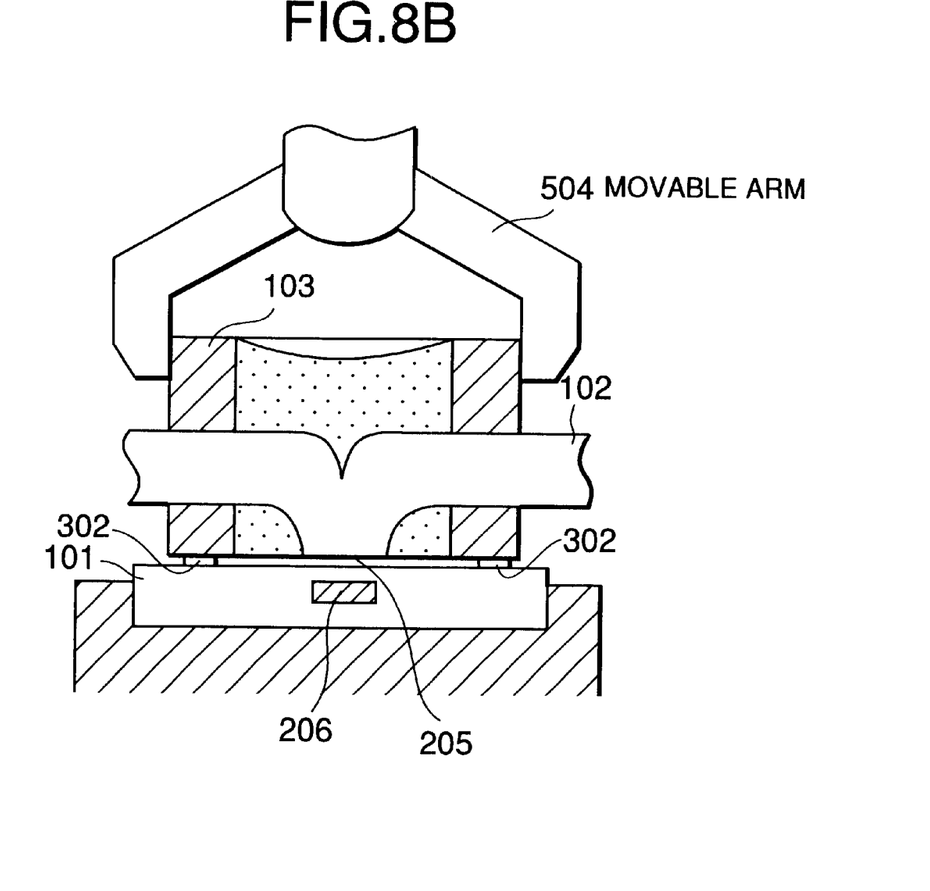

Next, as shown in FIG. 8B, the holder 103 holding the optical fiber 102 is picked up and moved over the light emitting device 101 by a movable arm 504. The movable arm 504 is movable in the X, Y and Z directions under the control of a control unit (not shown), and its positioning precision is 5 μm or less.

The movable arm 504 holding the holder 103 performs wine two-dimensional adjustment on the position of the holder 103 in such a way that the positioning marks on the holder 103 and the light emitting device 101 match with each other. When positioning has been done, the movable arm 504 places the holder 103 on the light emitting device 101 via a material (AuSn) for solder bumps.

Under this situation, the structure is heated to 300 to 350° C. by hot air or infrared rays, melting AuSn between the light emitting device 101 and the holder 103, after which the resultant structure is cooled to set and secure the solder bumps 302.

Another scheme is also available which fixes the holding jig 503 on an XY stage having a positioning precision of 5 μm or lower, executing two-dimensional positioning using the XY stage, and moving the movable arm 504 holding the holder 103 in the direction of the Z axis (up and down direction) to fix the holder 103 after positioning is completed.

As described above, positioning of the V-bent portion 104 in the frame of the holder 103 is implemented by two-dimensionally moving the optical fiber 102 as shown in FIG. 7A, and positioning of the holder 103 holding the optical fiber 102 and the light emitting device 101 is carried out by two-dimensionally moving the holder 103 and the light emitting device 101 as shown In FIG. 8B. In the above-described manner, an optical coupling structure where the light emitting section 206 of the light emitting device 101 is accurately aligned with the light-incident section 205 of the V-bent portion 104 can be completed merely by two-dimensional positioning.

Another example of V-bent portion formation will be described hereinafter with reference to FIGS. 9A–9D.

Figure 9A:
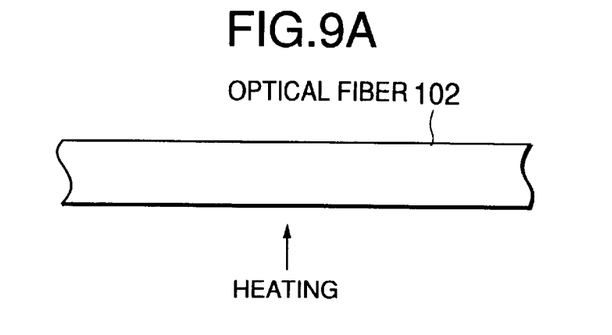
FIGS. 9A–9D illustrate a second example of a process for forming a V-bent portion in the optical coupling structure as shown in FIG. 3.

Referring to FIG. 9A, first, both ends of a portion where the V-bent portion of the optical fiber 102 is to be formed are fixed, and then this portion is heated up to near the softening point.

Figure 9B:
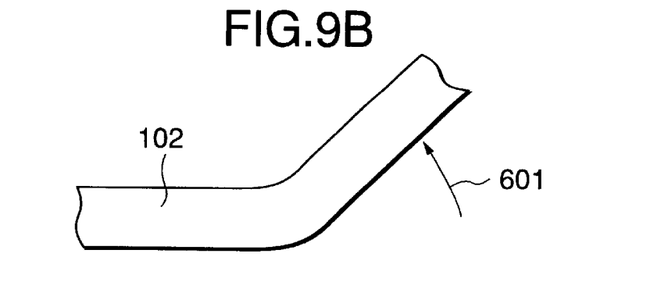

When the portion is heated up to near the softening point, one side of the optical fiber 102 is moved in a direction of an arrow 601 as shown in FIG. 9B. As a result, the optical fiber 102 is bent around the portion that has been heated up close to the softening point.

Figure 9C:
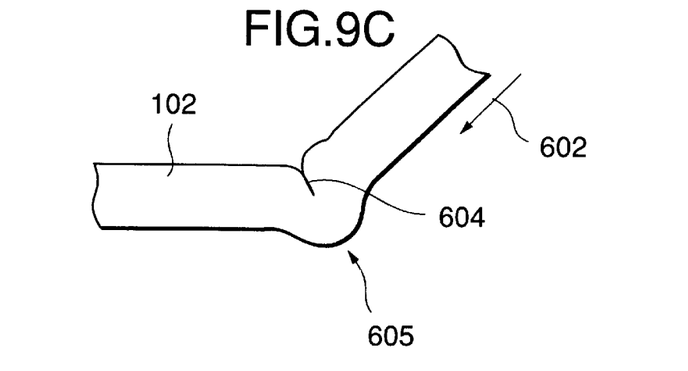

Subsequently, the moved side of the optical fiber 102 is pressed by a given amount in a direction of an arrow 602 along the axis of the optical fiber 102. This forms a cut 604 inward of the bent portion, a projection 605 formed outside as shown in FIG. 9C.

Figure 9D:
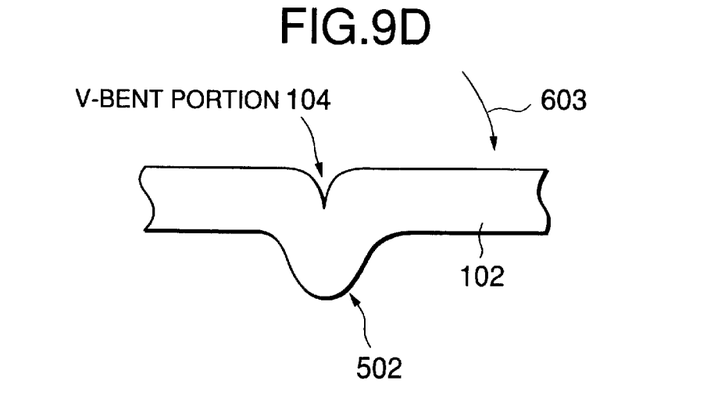

Then, the moved side of the optical fiber 102 is moved back to the original position in a direction of an arrow 603, thus forming the V-bent portion 104 having the cut and the projection 502, as shown in FIG. 9D.

OPTICAL COUPLING STRUCTURE FORMATION APPARATUS

Figure 10:
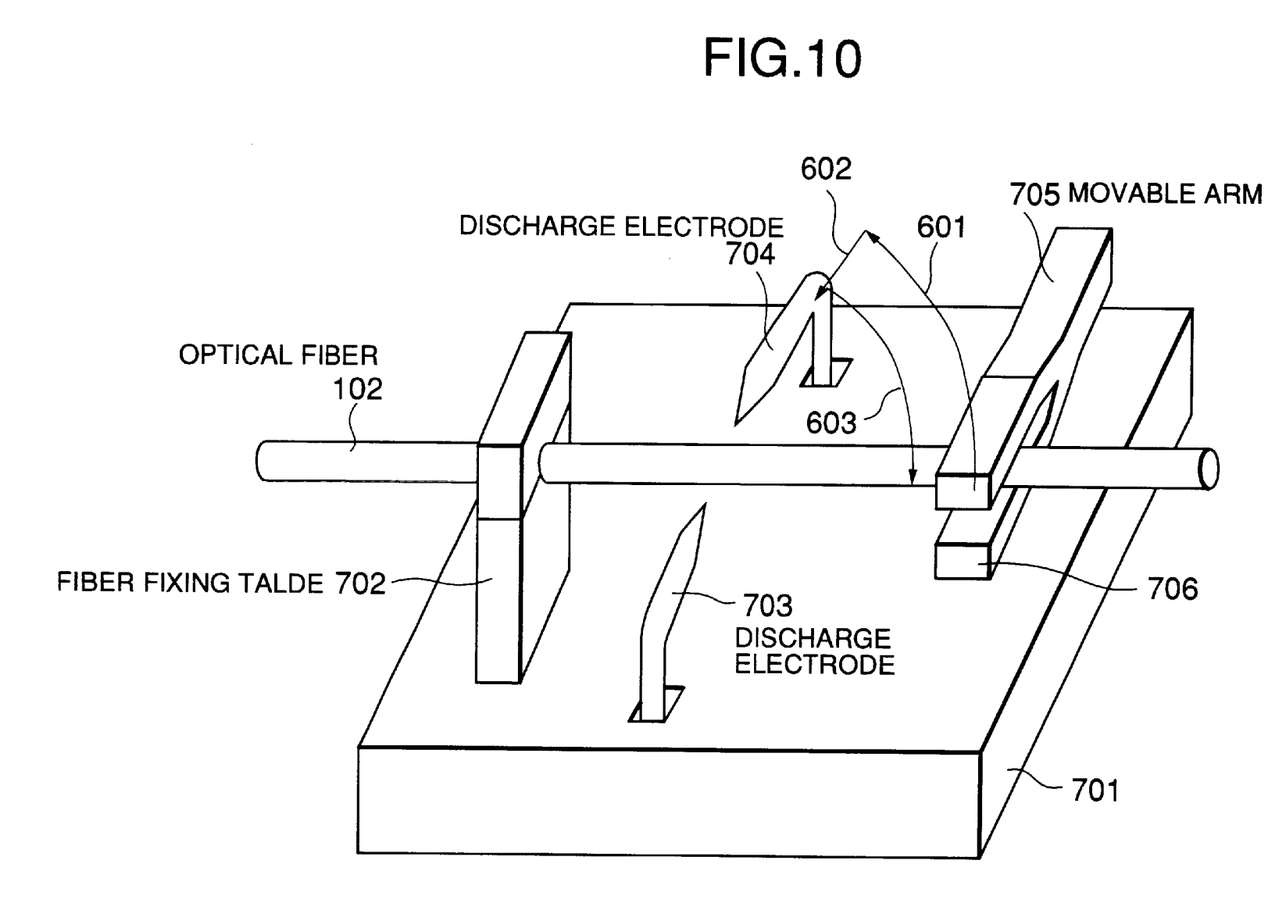
FIG. 10 is a perspective view exemplifying a V-shaped structure forming device for forming a V-bent portion.

FIG. 10 shows a V-shaped structure forming device for forming a V-bent portion. Provided on a support 701 are an optical fiber fixing table 702, discharge electrodes 703 and 704, and a movable arm 705. When applied with a high voltage, the discharge electrodes 703 and 704 discharge, heating the optical fiber 102 positioned between them. An optical fiber holder 706 is provided at the tip of the movable arm 705, which is movable in the X, Y and Z directions au indicated by arrows 601 to 603 in FIGS. 9B, 9C and 9D.

First, the optical fiber 102 is secured by means of the optical fiber fixing table 702 and the optical fiber holder 706 Then, discharging is caused between the discharge electrodes 703 and 704 to heat the optical fiber 102. When the optical fiber 102 is heated up to near the softening point, the movable arm 705 is moved in the direction of the arrow 601. This causes the optical fiber 102 around the heated portion.

Then, the movable arm 705 is moves by a given distance in the direction of the arrow 602, so that the cut 604 is formed inward of the bent portion, and the projection 605 is formed outside an shown In FIG. 9C. As the movable arm 705 is moved back to the original position in the direction of the arrow 603, the V-bent portion 104 having the cut and the projection 502 at the portion that has been heated by the discharge electrodes 703 and 704.

THIRD EMBODIMENT

Figure 11:
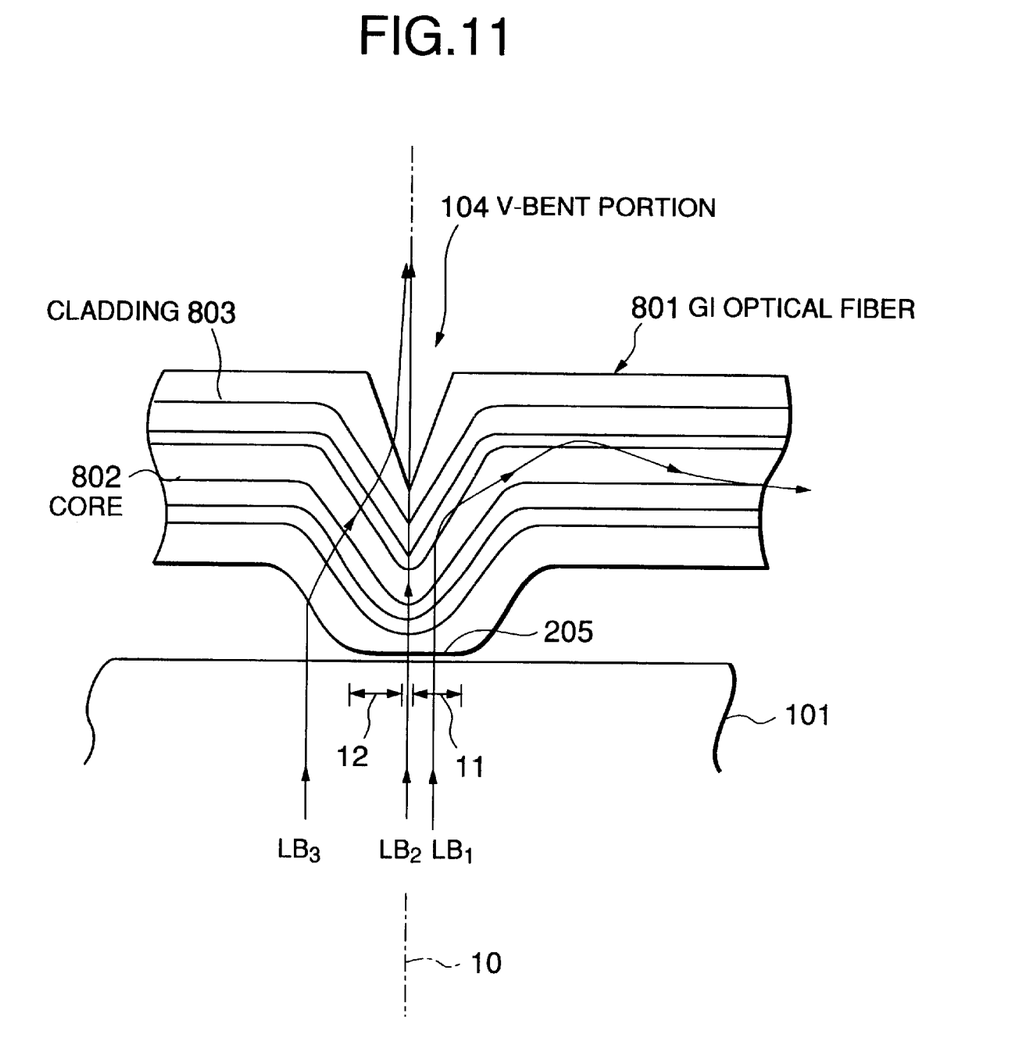
FIG. 11 is an exemplary cross-sectional view of a V-bent portion for explaining the operation of a third embodiment of this invention.

Referring to FIG. 11, is an exemplary cross-sectional view of a V-bent portion for explaining the operation of a third embodiment of thin invention. The third embodiment uses a graded-index (GI) optical fiber 801 whole refractive index continuously decreases from a core 802 at the center toward a cladding 803 around the core 802. Even with such a GI optical fiber 801 in use, this embodiment can form a similar V-bent portion 104 using the above-discussed method, and can have the same advantages as the first embodiment illustrated in FIG. 4.

More specifically, the flux of light $LB_1$, whose deviation from the bent plane 10 of the V-bent portion 104 lies within the predetermined effective ranges 11 and 12, after leaving the light output surface of the light emitting device 101, reaches the light-incident section 205 via an air layer between that light output surface and the light-incident section 205 of the optical fiber 102, and enters the core 201. If the inclination angle of the core 802 at the V-bent portion 104 is set in such a way that the light flux $LB_1$ does not go over to the cladding 803, the light flux $LB_1$ travels inside the core 802 as it is.

By way of contrast, The light flux $LB_2$ traveling along the bent plane 10 of the V-bent portion 104 and the light flux $LB_3$, whose deviation from the bent plane 10 lies outside the effective ranges 11 and 12 pass, through the optical fiber 102.

FOURTH EMBODIMENT

Figure 12:
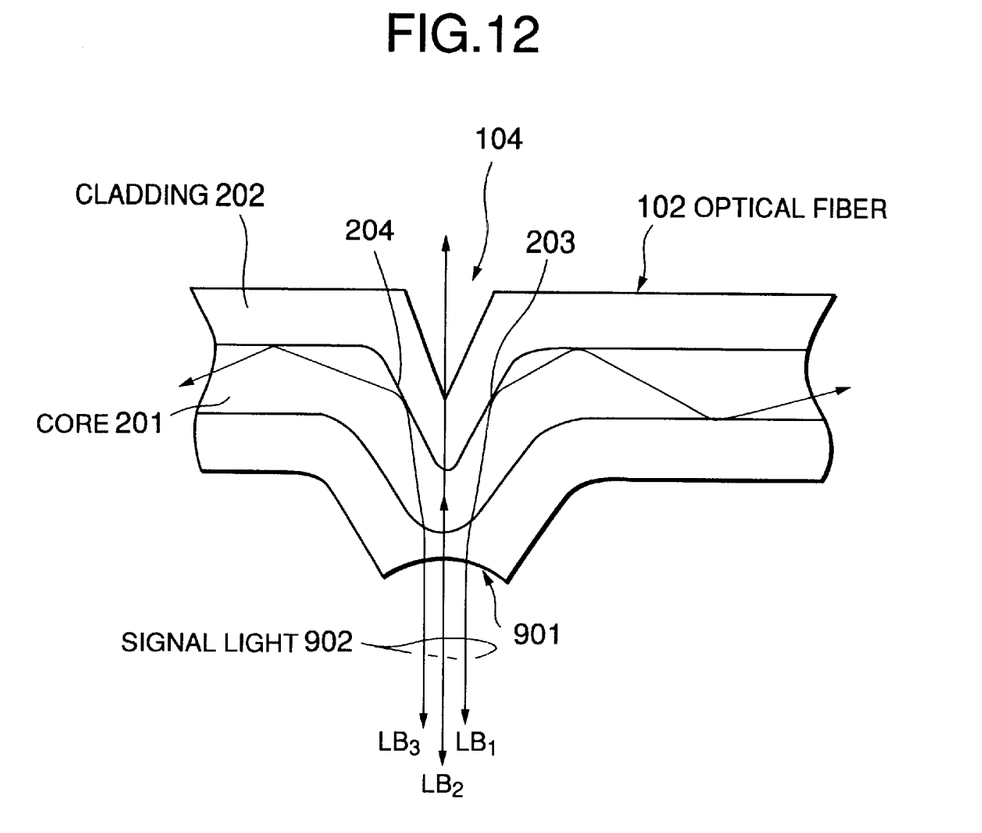
FIG. 12 is an exemplary cross-sectional view of a V-bent portion for explaining the operation of a fourth embodiment of this invention.

As shown in FIG. 12, while the fourth embodiment uses the same optical fiber 102 as used in the first embodiment, the fourth embodiment differs from the first embodiment in that a light-incident section 901 provided at the protruding side of the V-bent portion 104 is formed in the shape of a recess.

Although the light-incident section 205 is polished to be flat in the first to third embodiments, it is desirable to form it in a slightly recessed shape. This is because as signal light 902 from the light emitting device 101 hits on the recessed light-incident section 901, the optical path gets slightly wider around the V-bent portion 104, so that the signal light 902 is efficiently supplied into the core 201 of the optical fiber without making the inclination angles of the inclined surfaces 203 and 204 of the V-bent portion 104 acute.

FIRST APPLICATION EXAMPLE

As mentioned earlier, the output light from one light emitting section 206 can be split into two which can be acquired in the opposite directions, based on the positional relationship between the light-incident section 205 of the V-bent portion 104 or 901 and the light emitting section 206 of the light emitting device 101.

Figure 13:
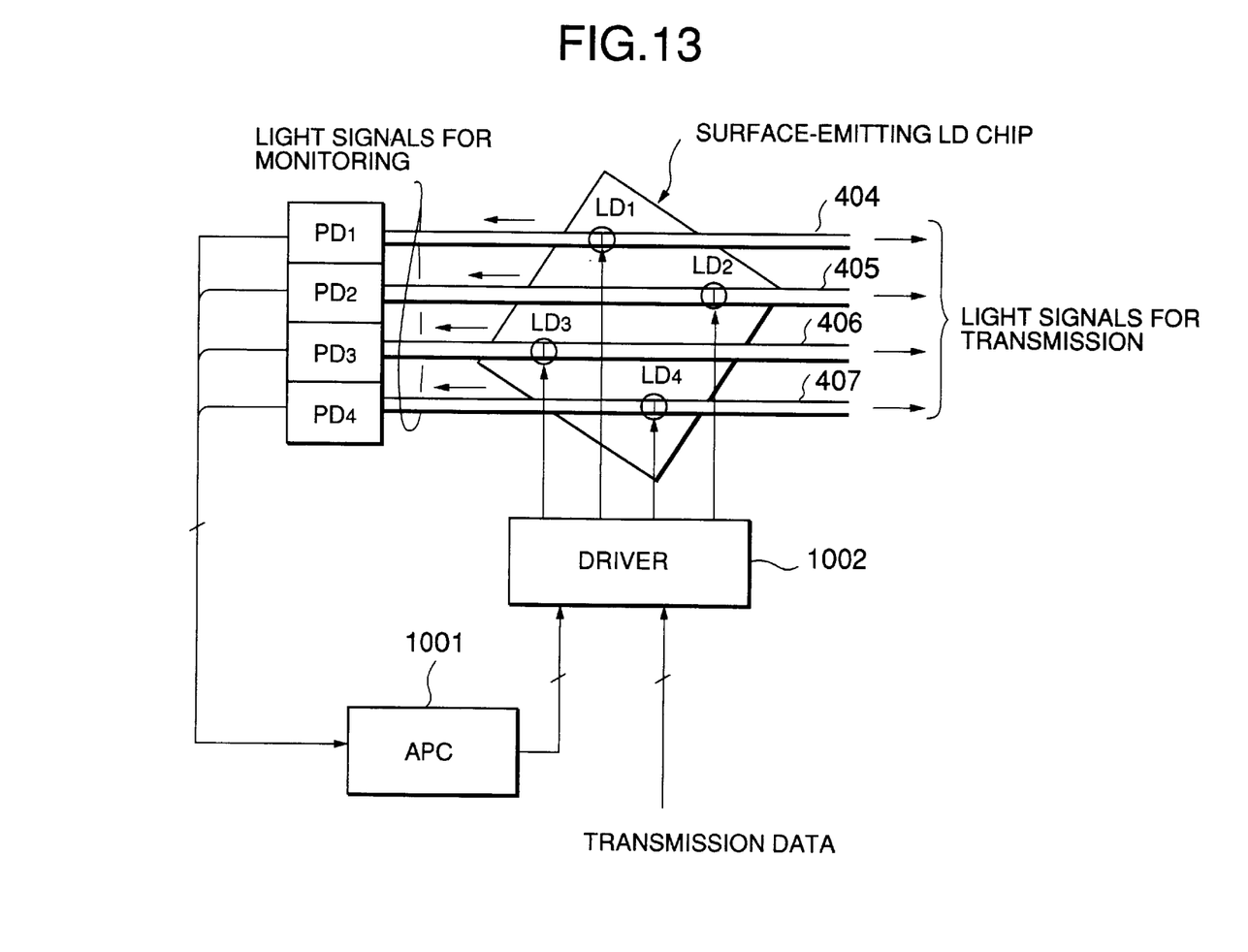
FIG. 13 is a block diagram illustrating a first application example of an optical device according to this invention.

AS shown in FIG. 13, in a first application example, a surface-emitting LD chip (see FIG. 5) cut out of a semiconductor wafer is used, and one output light from each optical fiber is used for data transmission while the other output light is used for monitoring the light emitting device.

Optional fibers 404 to 407 are optically coupled via respective V-bent portions 104 to four laser sources $LD_1$ to $LD_4$ which are formed on the surface-emitting laser diode chip. Photodetector& $PD_1$ to $PD_4$ are provided at one ends of the respective optical fibers 404–407, and the individual sensor outputs are transferred to an automatic power controller (APC) 1001. The four laser sources $LD_1$–$LD_4$ are driven by a laser drives 1002, which control the power of each laser source under the control of the APC 1001. The laser driver 1002 drives each laser source to send out a light signal in accordance with transmission data.

The light signal output from each of the laser sources $LD_1$–$LD_4$ is split into two at each associated V-bent portion, one transferred as a transmission light signal while the other one is input to the associated one of the photodetectors $PD_1$–$PD_4$ as a monitoring light signal. The APC 1001 monitors the monitor output of each photodetector at all times, and controls the driver 1002 so that the laser emission power is maintained at specific power.

SECOND APPLICATION EXAMPLE

Figure 14:
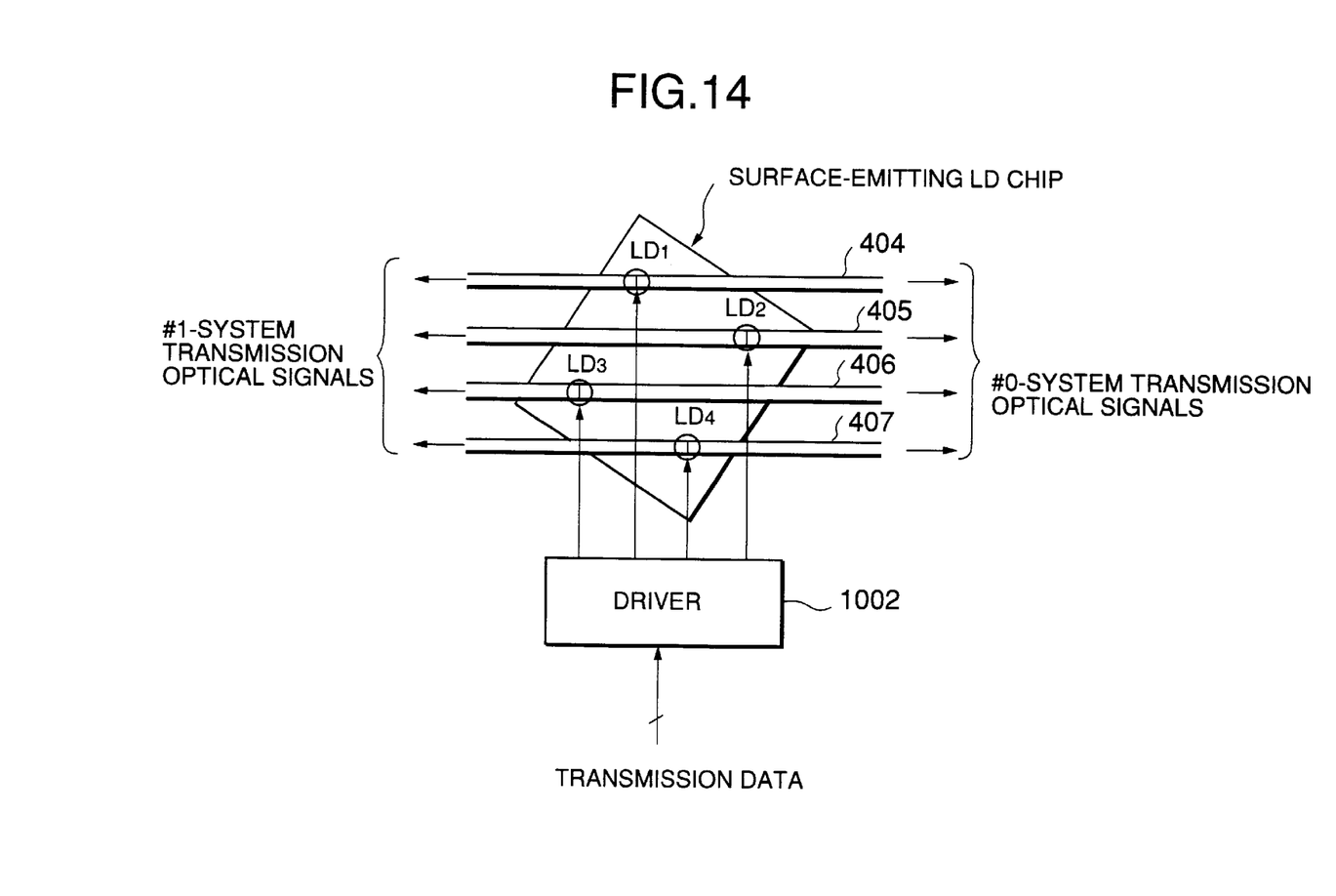
FIG. 14 is a block diagram showing a second application example of an optical device according to this invention.

Referring to FIG. 14, a second application example is of a redundancy system in which a surface-emitting laser diode chip (see FIG. 5) cut out of a semiconductor wafer is used, and two output lights from each optical fiber are both used for data transmission, one for a working system and the other for a protection system.

Optical fibers 404 to 407 are optically coupled via respective V-bent portions 104 to four laser sources $LD_1$ to $LD_4$ which are formed on the surface-emitting laser diode chip. The light signal output from each of the laser sources $LD_1$–$LD_4$ is split into two at each associated V-bent portion, one transferred as a transmission light signal for a #0 system and the other one a transmission light signal for a #1 system.

According to the optical coupling structure embodying this invention, as apparent from the first and second application examples, optical fibers can be laid in parallel to the light emitting surface of a surface-emitting laser diode chip and optical coupling requires no special member other than the V-bent portion 104 formed on each optical fiber. This structure can therefore accomplish optical coupling in less space and very easily and is considerably advantageous particularly for optical coupling of a surface emitting laser which has a plurality of light emitting sections arrayed two-dimensionally. What is more, as the output light is split into two, a variety of applications in addition to the first and second application examples may be contrived, widening the application range.

According to this invention, as described above in detail, because part of an optical waveguide is used to form a V-shaped inclined portion and a light-incident section, the optical waveguide can directly be arranged in parallel to the surface where the light emitting sections of a light emitting device are formed. This can reduce the required space significantly.

Further, optical coupling can be achieved merely by two-dimensionally positioning the light-incident section of the V-shaped inclined portion and the light emitting section of the light emitting device. Even when a surface-emitting laser diode having a plurality of light emitting sections arrayed two-dimensionally is used, therefore, optical coupling can easily be accomplished by simply positioning the V-shaped inclined portions of optical waveguides and the associated light emitting sections two-dimensionally.

Further, according to the present invention, the output light from one light emitting section can be split into two which can be acquired in the opposite directions, based on the positional relationship between the light-incident section of the V-bent portion and the light emitting section of the light emitting device.

Although several embodiments of the present invention have been described herein, it should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope of the appended claims.

What is claimed is:

1. An optical coupling structure for optically coupling a light emitting device to an optical waveguuide having a center portion of a relatively high refractive index and a peripheral portion of a relatively low refractive index, comprising:

a V-shaped inclined portion provided on part of said optical waveguide; and a light-incident section formed on a protruding side of said V-shaped inclined portion in association with a light emitting section of said light emitting device.

2. The optical coupling structure according to claim 1, further comprising a holder for holding said optical waveguide in such a way that said V-shaped inclined portion is arranged in association with said light emitting section.

3. The optical coupling structure according to claim 2, wherein said holder comprises a frame for holding said optical waveguide in such a way as to retain said V-shaped inclined portion inside.

4. The optical coupling structure according to claim 1, wherein an inclination angle of said center portion in said V-shaped inclined portion is set in such a manner that light coming from said light emitting section enters said center portion.

5. The optical coupling structure according to claim 1, wherein said light-incident section is formed flat and faces said light emitting section of said light emitting device.

6. The optical coupling structure according to claim 1, wherein said light-incident section is formed in a shape of a recess and faces said light emitting section of said light emitting device.

7. An optical device comprising:

a light emitting device having at least one light emitting section;

at least one optical waveguide comprised of a core of a relatively high refractive index and a cladding of a relatively low refractive index, and having a V-shaped inclined portion provided on part of said optical waveguide, and a light-incident surface formed on a protruding portion of said V-shaped inclined portion; and a holder for holding said optical waveguide in such a way that said light-incident surface of said V-shaped inclined portion is associated with one light emitting section of said light emitting device.

8. The optical device according to claim 7, wherein an inclination angle of said center portion in said V-Shaped inclined portion is set in such a manner that light coming from said light emitting section enters said center portion.

9. The optical device according to claim 7, wherein said V-shaped inclined portion is arranged at such a position that said light emitting section associated with said V-shaped inclined portion is separated into two.

10. The optical device according to claim 9, wherein light output from said light emitting section is split by said V-shaped inclined portion into two components traveling in opposite directions.

11. A method for optically coupling a light emitting device to an optical waveguide having a center portion of a relatively high refractive index and a peripheral portion of a relatively low refractive index, comprising the steps of:

emitting a light beam from the light emitting device;

receiving the light beam at a light-incident section formed on a protruding side of a V-shaped inclined portion provided on part of said optical waveguide, wherein the light-incident section is provided in association with a light emitting section of said light emitting device; and reflecting the light beam at said V-shaped inclined portion to propagate through the center portion of the optical waveguide.

12. The method according to claim 11, wherein an inclination angle of said center portion in said V-shaped inclined portion is set in such a manner that light coming from said light emitting section enters said center portion.

13. The method according to claim 11, wherein said light-incident section is formed flat and faces said light emitting section of said light emitting device.

14. The method according to claim 11, wherein said light-incident section is formed in a shape of a recess and faces said light emitting section of said light emitting device.

* * * * *